Figure 1:
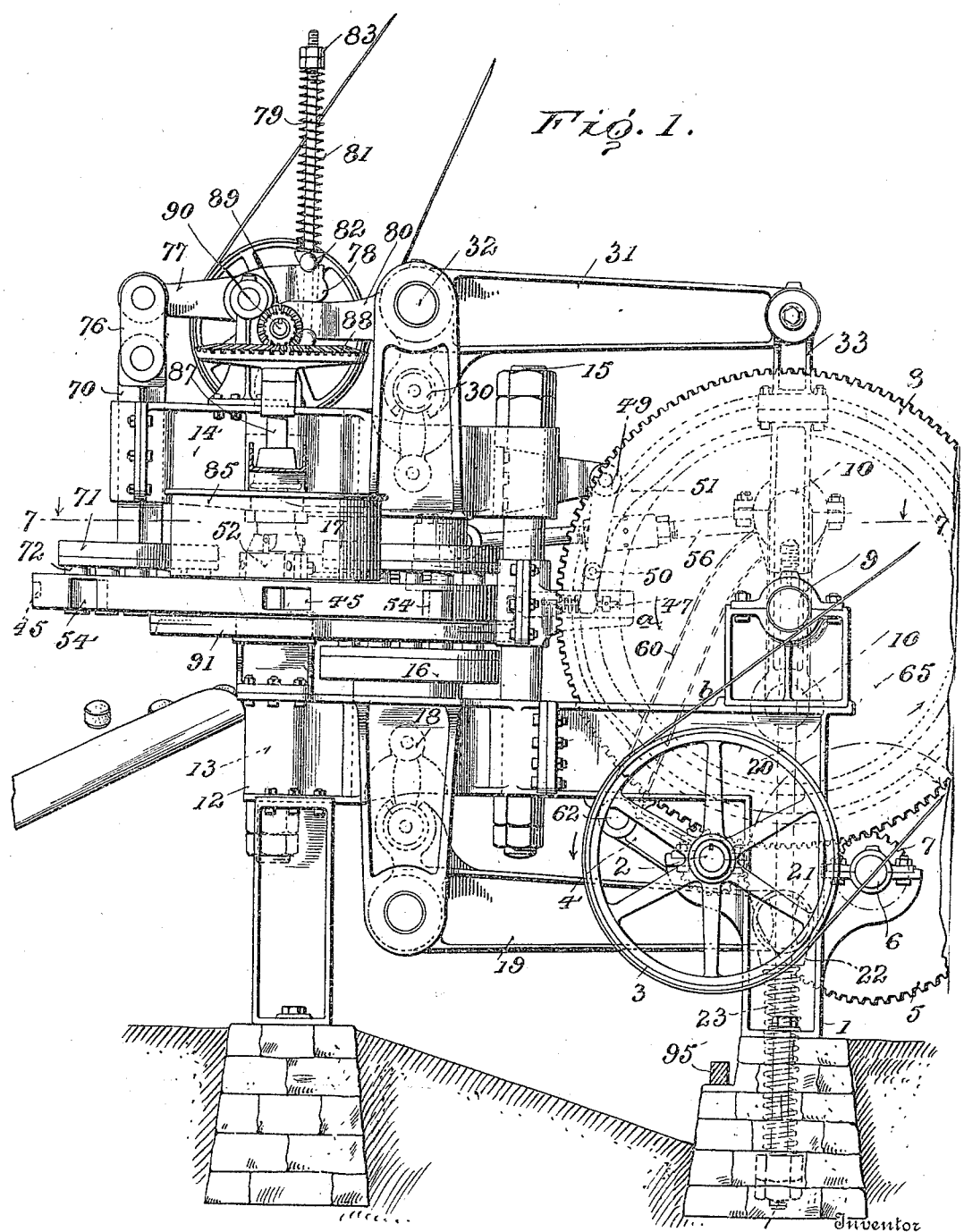

E. D. MISNER.
MOLDING MACHINE.
APPLICATION FILED APR. 18, 1908.

958,520.

Patented May 17, 1910.
7 SHEETS—SHEET 1.

Witnesses
W. A. Williams

Inventor
Edgar D. Misner
By
Attorney

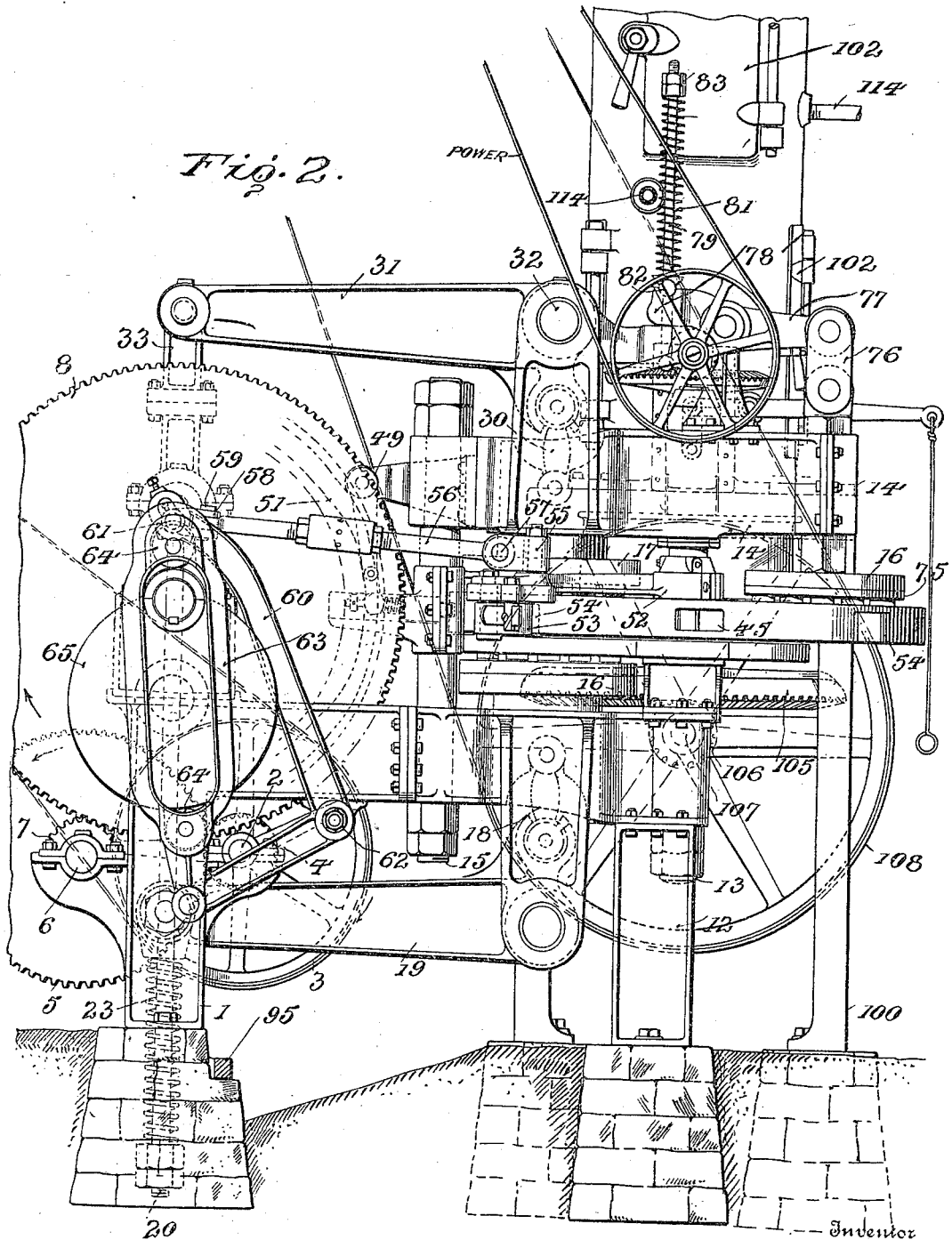

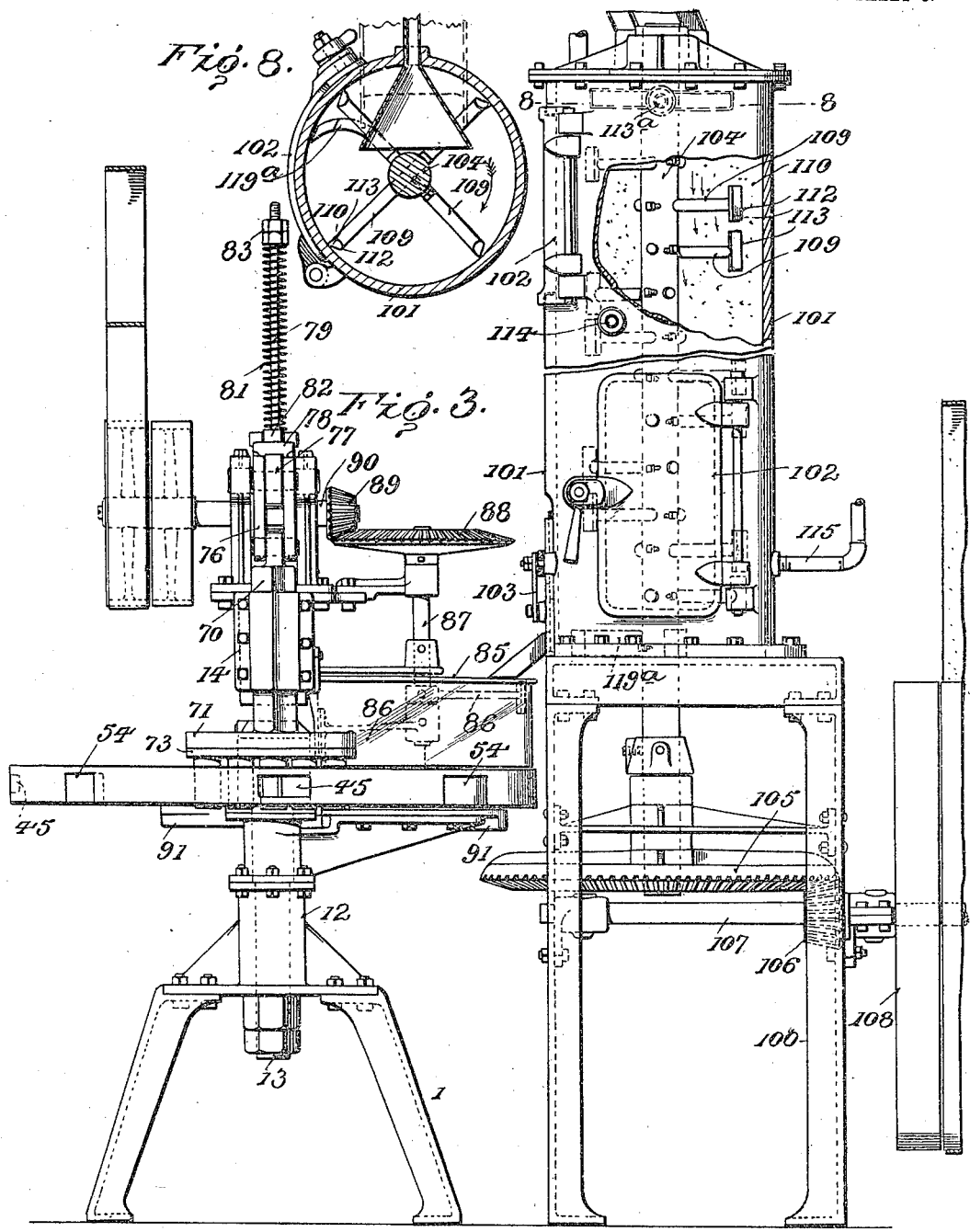

E. D. MISNER.
MOLDING MACHINE.
APPLICATION FILED APR. 18, 1908.
958,520.
Patented May 17, 1910.
7 SHEETS—SHEET 4.
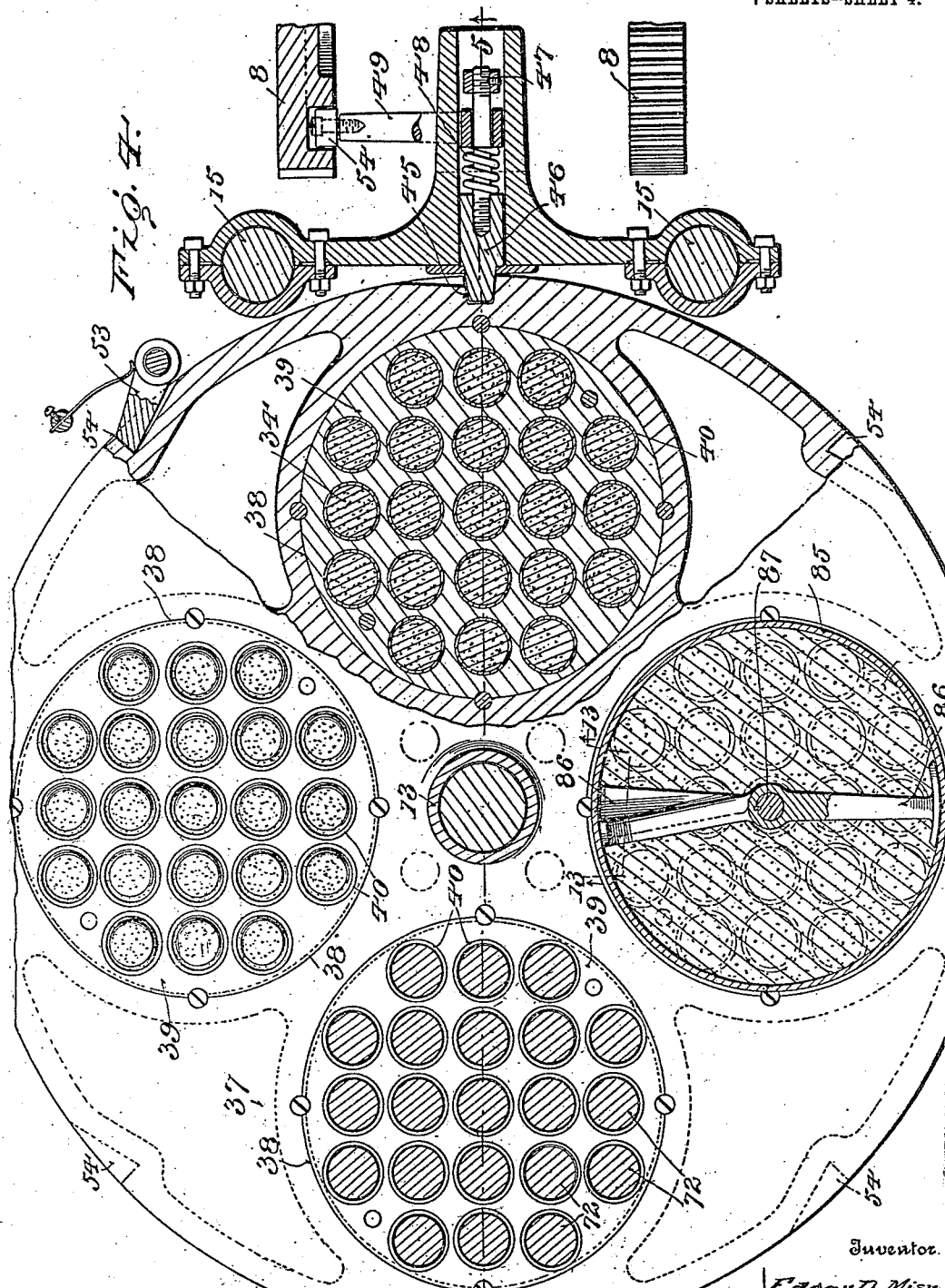

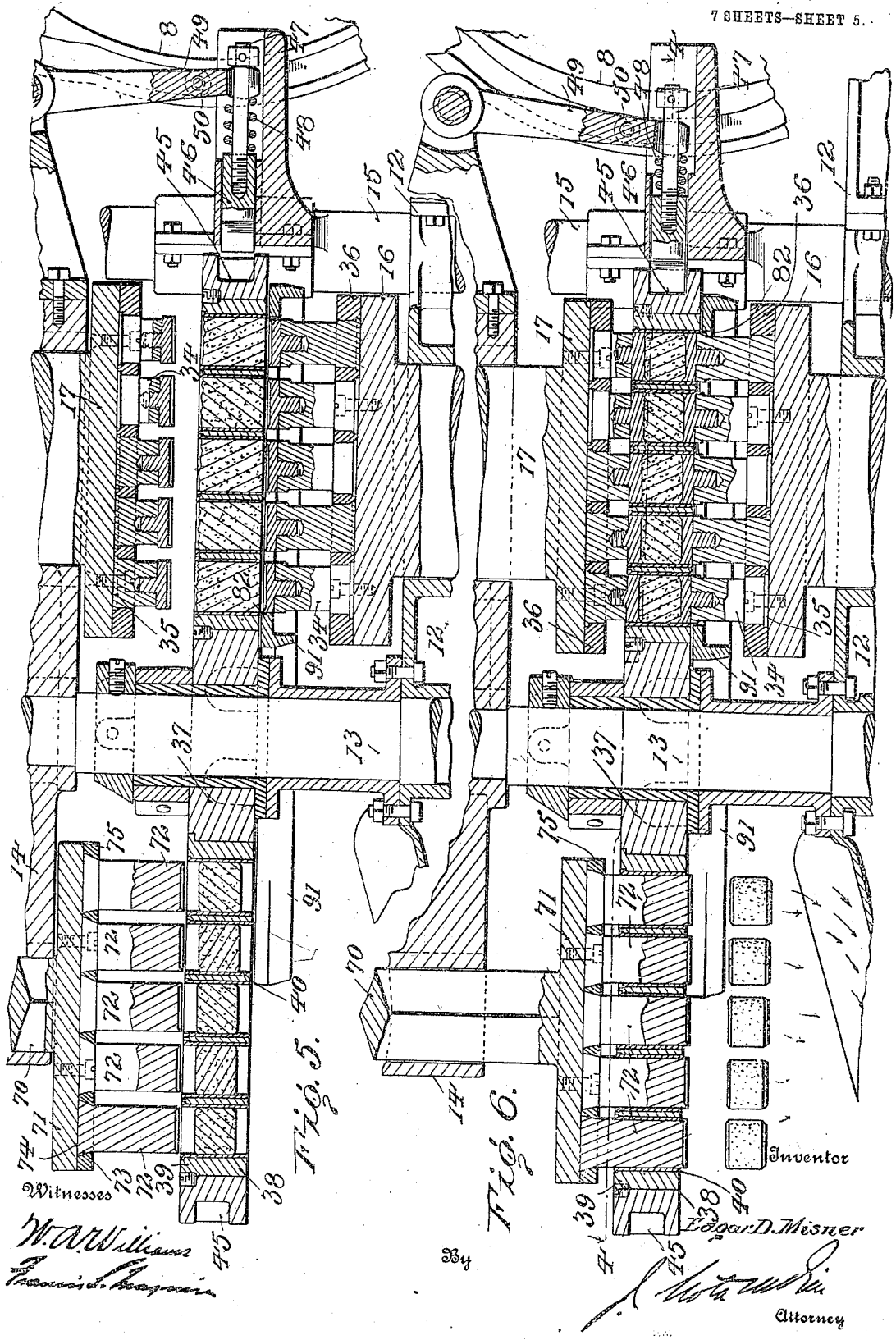

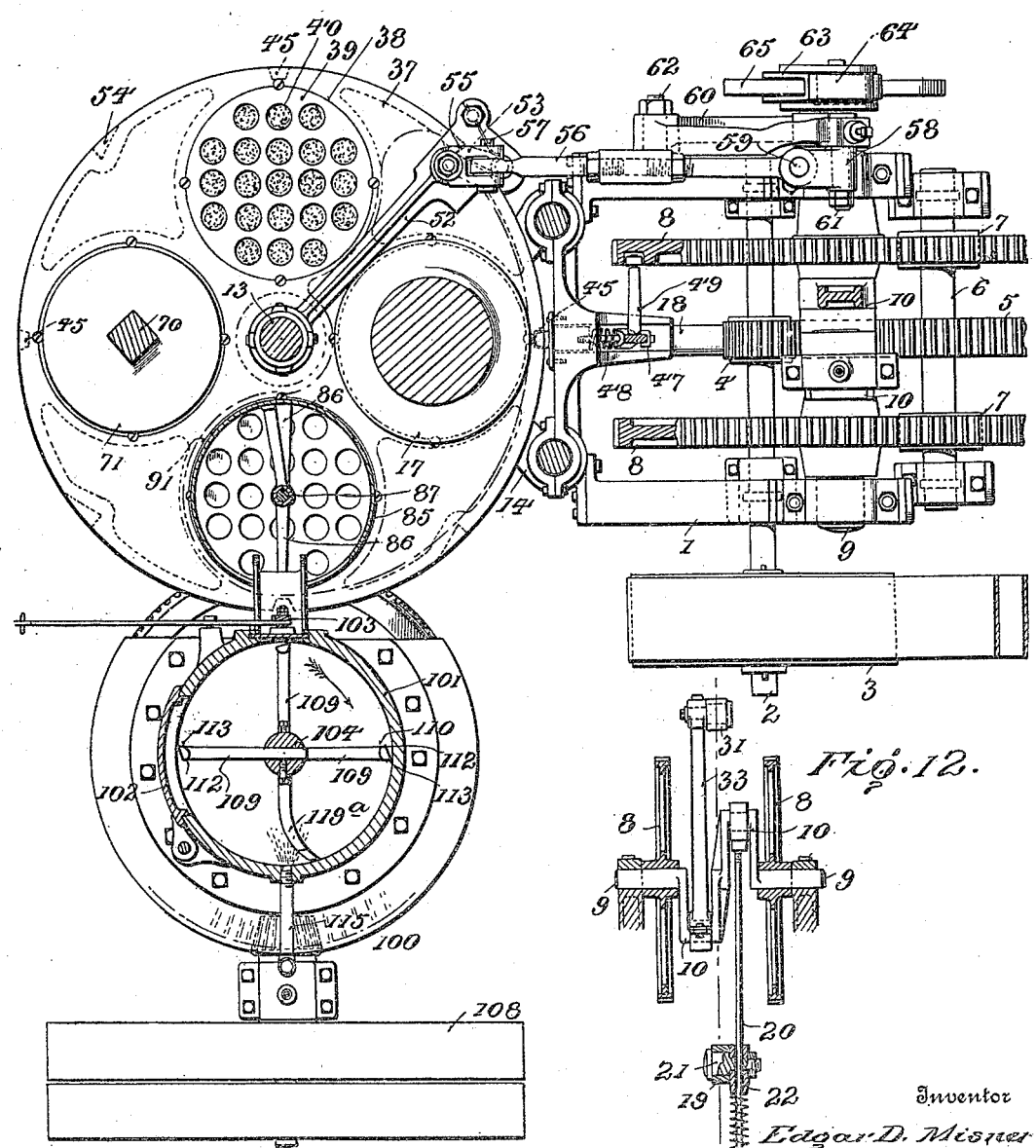

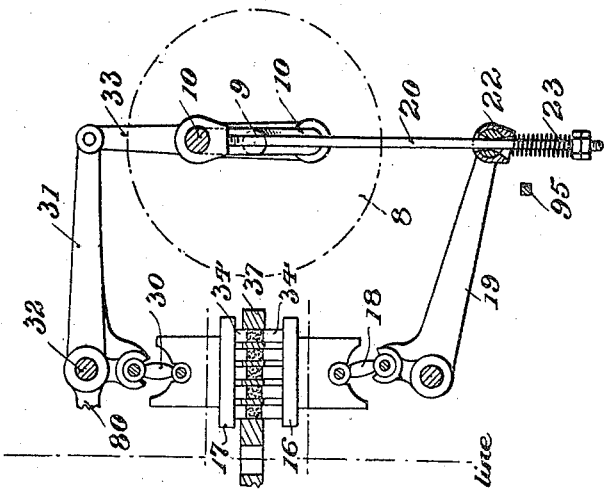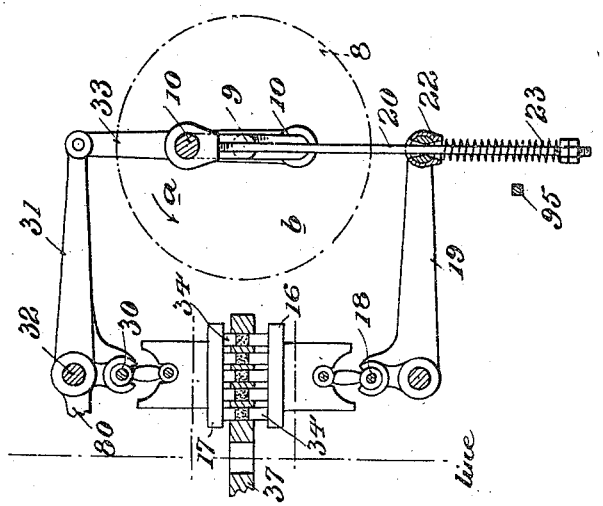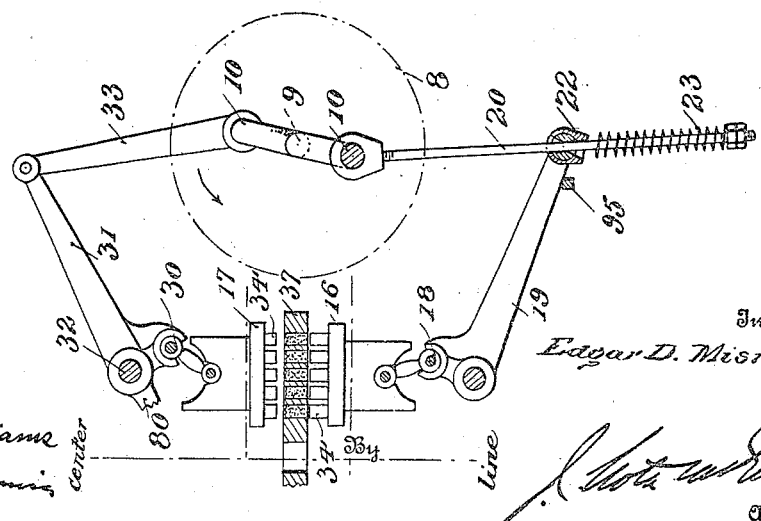

UNITED STATES PATENT OFFICE.

EDGAR D. MISNER, OF ST. LOUIS, MISSOURI, ASSIGNOR OF ONE-THIRD TO JAMES E. RUTLEDGE AND ONE-THIRD TO JOHN SCULLEN, OF ST. LOUIS, MISSOURI.

MOLDING-MACHINE.

958,520.     Specification of Letters Patent.     Patented May 17, 1910.

Application filed April 18, 1908. Serial No. 427,837.

*To all whom it may concern:*

Be it known that I, EDGAR D. MISNER, of St. Louis, in the State of Missouri, have invented certain new and useful Improvements in Molding-Machines; and I do hereby declare the following to be a full, clear, and exact description of the invention, such as will enable others skilled in the art to which it appertains to make and use the same.

This invention relates to machines for forming briquets from pulverulent material.

The primary object of the invention is to so construct and arrange the parts as to enable the charging of the material, the compressing thereof, and the ejecting of the briquets to be carried on without interruption.

Further objects are to insure uniform distribution of the pulverulent material in the pockets of the mold housings; to secure uniformity in the pressure of the coöperative formers or plungers; to accommodate charges of material of varying densities; to facilitate the operation of the charging and compressing mechanism; and finally to produce a machine of this character which will be certain in operation and insure the quick and thorough formation of briquets.

The invention will be hereinafter fully set forth and particularly pointed out in the claims.

In the accompanying drawings, Figure 1 is a side elevation. Fig. 2 is a view from the opposite side. Fig. 3 is a front elevation, parts in the rear being omitted. Fig. 4 is detail plan view of the platform part in section. Fig. 5 is a vertical section on the line 5—5, Fig. 4. Fig. 6 is a view similar to Fig. 5, but showing the plungers in normal position. Fig. 7 is a plan view, parts being in section. Fig. 8 is a detail cross section on line 8—8, Fig. 3. Fig. 9 is a diagrammatic view showing the plungers in normal position. Fig. 10 is a similar view, parts in position for compressing the charges. Fig. 11 is a similar view, parts in position when the pockets are overcharged. Fig. 12 is a detail front view of the crank shaft and its connections with the plunger bell crank levers. Fig. 13 is a detail view on line 13—13, Fig. 4.

Referring to the drawings, 1 indicates a main frame; 2 a drive-shaft; 3 a band pulley; 4 a pinion; 5 a gear wheel in mesh with pinion 4; and 6 a counter-shaft carrying two pinions 7. These pinions 7 mesh with two large gear wheels 8 fast on a crank-shaft 9, supported in bearings on frame 1 and having two oppositely disposed cranks 10.

Extending from the main frame is a supplemental frame 12 supporting a vertically disposed post 13, which is also secured to an upper second supplemental frame 14. The two frames 12 and 14 are also connected by posts 15, and are formed with alined guideways for two plunger-supporting heads 16 and 17. The head 16 has a toggle connection 18 with lever 19, which latter, as shown, is in the form of a bell-crank with the free end of its short arm formed with a rounded recess to accommodate the lower rounded end of the link, the other end of which latter is likewise rounded to fit in a correspondingly formed recess located centrally of head 16. In this way I am enabled to secure a maximum pressure, and in the last stages of movement in making the toggle I am enabled to impart to the plungers a pressure almost equal to the square of the degrees of their travel. The fulcrum for the lever 19 is in direct line beneath the pivot of the upper end of link 18. At its outer end this lever 19 has a special form of connection with one of the cranks 10. This connection comprises a boss 21, on the bell crank lever formed with an opening to accommodate pitman 20; a sleeve 22 which embraces the boss, and a coiled spring 23 between the sleeve and nuts on the lower end of the pitman. The function of this construction is to prevent injury to the parts if the compressing dies are not able to move the normal and usual distances toward each other; that is, it allows of retardation in the movement of the lower compressing plungers should there be an overcharge of material in the pockets, and yet permits the crank and pitman operating such lower plungers to complete their cycle of movement.

The plunger-supporting head 17 likewise has a toggle connection 30 with a lever 31, the construction of the link and the seats therefor on the short arm of the lever 31 and in the upper end of the plunger head 17 being similar to that before described. The lever 31 is connected by a pitman 33 to the other crank 10. This connection imparts a positive determinate movement to the plunger-supporting head 17, while the companion plunger-supporting head may have a varying movement by reason of its yielding-connection with the operating crank-shaft 9.

Each plunger-supporting head carries a series of plungers or formers 34, (preferably twenty-one in number) those of the lower head being greater in length than those of the upper head. Each plunger is shown as being cylindrical, and as flanged at its outer end 35, a slight depression being on its operative face, to give the briquets a rounded or finished appearance on the ends. The operative end of each plunger is detachable, being held by a threaded stem engaging an opening in the plunger body. Hence in case of wear these operative ends may be readily replaced.

A retaining plate 36 is secured to each head 16, 17. They are formed with openings and recesses to accommodate the plungers and the flanges 35, the openings and the recesses being a trifle large to form a loose fit.

Revolubly mounted on post 13, is a horizontally-disposed circular platform 37 having four equi-distant circular openings 38 to accommodate circular mold-housings 39 formed with pockets 40 corresponding in number to the two sets of plungers. In the periphery of this platform, adjacent to each housing, is a notch 45, with which coöperates a locking dog 46, to fixedly hold the platform in different positions during the molding or compressing operation. This dog 46 is slidable in a way formed in a bar extending between posts 15, and projecting from said dog is a headed pin 47, encircled by a spring 48. A lever 49, fulcrumed on a bracket of the upper supplemental frame 14, straddles pin 47, and bears against spring 48. This lever is provided with a friction roller 50 which extends into a groove in a casting secured to one of the gear wheels 7. The wall of this groove acting on roller 50 will force lever 49 against the head of bolt 47 to release the dog from the platform to permit the latter to be revolved.

The platform actuating-mechanism comprises an arm 52, mounted on post 13, concentrically with the axis of the platform and projecting radially of the latter, and having on its underside at its outer end, a pawl 53, which engages a series of equi-distant notches 54 on the periphery of platform 37, such notches being intermediate the notches 45. Pivotally mounted on the upper side of arm 52 is a link 55 to which a rod 56 is pivoted by a bolt 57. The other end of rod 56 is pivoted to a link 58 by a pin 59, and this link is connected to the long arm of a bell crank lever 60 by a pin 61. The bell crank lever 60 is fulcrumed to the main frame at 62, and its short or lower arm is pivoted to a vertically-disposed yoke 63, having two friction rolls 64, bearing on the periphery of a cam 65, mounted on crank-shaft 9. Cam 65, acting upon the upper roller 64, elevates yoke 63, and this imparts motion through the described connections to arm 52, causing the platform to be moved one-quarter revolution. By reason of the position of the cam relative to that of the pawl, it is necessary that a universal joint be formed at the ends of rod 56, hence the arrangement of links just described.

70 designates an ejector having a rod vertically movable in a bearing on supplemental frame 14. This ejector comprises a head 71, and depending cylindrical plungers 72 corresponding in number to the pockets of the mold-housings. Each ejector-plunger is enlarged at its upper end 73, which ends are fitted so as to have a slight play in seats formed in a plate 75 secured to the underside of head 71. To the upper end of the ejector rod is connected a link 76 pivoted to one arm of a lever 77 fulcrumed on a bracket supported by frame 14. The short arm of lever 77 forms a cam 78 and through it is a vertical opening to accommodate a rod 79, having on its lower end a head to engage the underside of a projection 80 of the toggle operating lever 31. The outer or free end of said projection forms a cam to engage cam 78. The rod 79 forms a connection between lever 77 and lever 31, and that portion of the rod above lever 77 is encircled by a coil spring 81, which fits between a bar 82, through which the rod passes, and nuts 83, on the upper end of said rod. This construction serves to retain the cammed ends of the levers together, and at the same time provides a yielding connection and insures the return of the ejector to its normal position.

Located directly above platform 37 and midway between the compressing plungers and the ejector, is a hopper 85 which is secured to the upper frame 14, and within this hopper are upper and lower spreaders 86 mounted on a shaft 87. The lower spreader 86 inclines in the direction of its travel (see Fig. 13) and contacts with (or nearly so) the inner wall of the hopper to scrape the material therefrom and spread it as near as possible evenly in the pockets of the several mold-housings as they are successively brought thereunder. The vertical edge of the inner end of the lower spreader terminates about over the central one of the pockets or directly under the center of shaft 87 (see Fig. 3). By this arrangement, and the angular disposition of the spreader, the pulverulent material is distributed alike to all the pockets. Shaft 87 is provided at its upper end with a beveled gear wheel 88, which meshes with a beveled pinion 89, mounted on a horizontal shaft 90, having a band wheel by which power may be communicated to this portion of the machine.

Beneath platform 37 is a fixed plate 91, which extends from a point beneath the hopper to and intersects the plane of movement of the compressing plungers. This plate forms a false bottom for each mold-housing while being charged with material and thereafter while being moved into position in alinement with the compressing plungers. It is spaced a trifle from the bottom of the platform, and at one end is formed with a series of openings 92 to accommodate the lower set of plungers After each mold-housing is charged the platform is given a quarter revolution to bring the charged housing in position opposite the compressing plungers, the lower set thereof then forming the support for the material. At this point I desire to emphasize the fact that the lower set of plungers do not move below the plane of the top surface of the false bottom formed by plate 91, since a stop 95 limits the movement of bell crank lever 19. This insures the upper or operative ends of the lower plungers 34, being maintained on a level with the false bottom, and thereby form a part thereof to support the material. This also accomplishes an additional and more important result, in that it insures each of the pockets retaining its full quota of material.

Upon a frame 100 is located a heating tank 101, having a cover, three inlet doors 102, and a gate 103. A vertically-disposed shaft 104 extends centrally through the tank, and on its lower end is a beveled gear-wheel 105 meshing with a beveled pinion 106, on a shaft 107, having a pulley 108, and mounted in frame 100. That portion of the shaft within the tank is formed with a series of openings 109, to receive the shanks 110 of a series of agitators arranged each at an angle of about 45 degrees. The lower agitator, 110$^a$, is different from the others in that it is formed of flat metal, and is curved at its outer end. The other agitators, are however, all alike, and each consists of a round shank, having its end swaged at right angles to form a vertically disposed head 111. The outer face of the head is flattened and beveled to provide a scraping edge 113 which fits snugly against the tank. The shanks are adjustably fitted in openings 109, and are arranged one above the other so that the path of movement of the heads will overlap to insure scraping the entire inner surface of the tank. When the operative edges 113 of the agitators become worn the latter may be readily readjusted by releasing the set screws and then tapping the protruding ends of the shanks so as to reposition the agitators in more extended positions.

A charging chute from an elevator enters the top of the tank to introduce a wide and comparatively thin but constant supply of pulverulent material to the agitators, and located near the top of the tank at a point directly beneath the chute is a pipe 113$^a$, having a tapered flat nozzle to supply superheated steam to the material as it enters the heater and while it is in a loose state. Other pipes, indicated at 114, may also furnish additional supplies of superheated steam to the material as it falls in the tank, and near the bottom of the latter is a pipe 115, to supply live steam. A pipe 116, is shown at the top of the tank for the escape of surplus steam and moisture after impregnating the material. Beneath gate 103 is a chute through which the material is discharged from the bottom of the tank to hopper 85.

In operation, the mixture of proper proportions, including a large percentage of powdered coal, is introduced in the tank, the superheated and live steam being turned on. As the material enters the tank it is impregnated, while loose, with the steam, and is caught by the agitating fingers, and gradually fed toward the bottom. The construction and arrangement of the agitators is such that the material will be drawn from the wall of the tank and thrown toward the center, thus causing a thorough intermingling of ingredients. The pulverulent mixture is scraped from the bottom of the tank and forced out the gate and through the chute into hopper 85. Assuming the parts to be in the position shown in Fig. 7, the hopper spreaders are filling the various pockets of the mold-housing directly thereunder. At this time the cranks 10 move the two bell crank levers 19 and 31 to withdraw the compressing plungers from the pockets of the mold-housing in alinement therewith. As previously stated the movement of the upper set of compressing plungers is positive as they always travel in a determinate path or over a fixed distance. Continued movement of the bell crank levers will remove both sets of plungers 34 entirely out of the pockets of the mold-housing to permit the platform to be moved. During the period the upper set of compressing plungers is moving from the pockets, so also is the lower set of plungers moving downwardly. When the upper operative faces of the lower set of plungers reach the upper plane of the false bottom, they are stopped by projection 95 arresting lever 19, but at this time the crank operating the latter has not reached its limit of movement. As the crank continues to move downwardly, in the direction of arrow $a$, Figs. 7 and 10, from about the point $b$ to its extreme downward movement, the pitman works freely through the end of lever 19.

Just before the cranks reach their limits of movement, or at the time the plungers are clear of the pockets, the cam groove 51, withdraws the locking dog 46, and cam 65 actuates yoke 63, which through the described connection moves the radial arm 52 and pawl 53. This effects the turning of the platform one-quarter revolution to bring the charged mold-housing from beneath the hopper into position opposite the compressing plungers, and the locking dog is thereupon returned to engage and hold the platform just preceding the entrance of the plungers into the pockets. The platform-moving arm 52 is then returned to normal position. The platform now being again fixedly-held, and as the cranks are moving continuously, the compressing of the charge takes place. The ingredients of the pulverulent mixture vary in density, for which reason it is essential to provide means for retarding the movement of the plungers, and yet permit the operating means to complete its full cycle of movement, when an abnormal charge, due to density et cetera, is in the pockets. If, for instance, the pockets should have an abnormal charge, due to improper mixture, packing or massing of the ingredients, the two sets of plungers could not be freely moved toward each other. Under such circumstances, while the cranks 10 continue to revolve, the upper and lower plungers and the interposed condensed material move as one body in the mold, the spring 23 taking up the movement of lever 19 without injury to the plungers. Obviously by this construction abnormal charges of pulverulent material cannot under any circumstances clog the machine or prevent the operating parts from completing a definite cycle of operation. While the briquets are being thus formed by the compressing plungers, a second mold-housing is being charged with pulverulent material from the hopper, and the operation is repeated as this mold-housing is brought into line with the compressing plungers. As the third mold-housing, suitably charged, is presented to the plungers, the one containing the first formed set of briquets is in position beneath the ejector, and in each operation thereafter a mold-housing containing briquets will be presented in like manner to the ejector.

During each compression the projection 80 of lever 31 is elevated and contacts with the cam end 78 of the lever 77, and forces the ejector plungers downwardly to eject the briquets from the mold-housing located thereunder. When the compressing plungers are withdrawn from a mold-housing the spring 81 acting on lever 77, simultaneously withdraws the ejecting plungers, thus permitting the platform to be turned for the next operation.

In a machine of this character it is almost impossible to insure absolute registry of the various plungers with the pockets, and to meet this contingency the compressing plungers have a very slight play in their supports, so that in the event the pockets are not in direct alinement with the plungers, the latter will nevertheless find the pockets and fit snugly therein.

I claim as my invention:—

1. In a briquet machine, the combination with a mold-housing having a series of pockets, and means for feeding pulverulent material to the pockets, of two sets of oppositely-disposed plungers designed to work in said pockets, a crank-shaft, upper and lower levers for actuating said plungers, means positively connecting the upper lever to said crank-shaft, a pitman connected to said crank-shaft and in engagement with the lower lever, a spring interposed between the last mentioned lever and said pitman, and a stop for limiting the movement of the lower lever when it is actuated to withdraw the lower set of plungers from the mold housing, whereby further movement of said pitman after said lower lever is arrested by said stop will not affect such lever.

2. In a briquet machine, the combination with a mold-housing having a series of pockets, and means for feeding pulverulent material to the pockets, of two sets of oppositely-disposed plungers designed to work in said pockets, a crank-shaft, upper and lower levers for actuating said plungers, the lower lever having a boss formed with an opening, a pitman connected to said crank-shaft and extended through said boss, a spring forming a yielding bearing between said pitman and said boss, a stop for limiting the movement of said lever when it is actuated by said pitman to withdraw the lower set of plungers from the mold housing, and means positively connecting the upper lever to said crank-shaft.

3. In a briquet machine, the combination with a platform, and a series of mold-housings carried thereby formed with pockets, of a hopper located above the platform for successively supplying pulverulent material to each mold-housing, a false-bottom above which the charge-receiving mold-housing is designed to be located, said false-bottom having at one end openings corresponding to the pockets in the mold-housings, upper compressing plungers, lower compressing plungers fitted in said openings of the false-bottom and designed to support the material in a previously-charged mold-housing when brought into line therewith, upper and lower levers for operating the upper and lower sets of plungers, a crank shaft, a yielding connection between said lower lever and said crank shaft, and a stop for limiting the downward movement of said lower lever so as to prevent said lower set of plungers from being withdrawn through the openings in said false bottom by the action of said crank shaft.

4. In combination with a molding machine, a heating tank for the pulverulent material, a vertically-disposed shaft located centrally within said tank, a series of radially-arranged scraper arms carried by said shaft, each scraper arm having a shank fitted in an opening in said shaft, means for adjustably holding the shank of each arm to said shaft to permit the arms to be adjusted lengthwise of their shafts, and means for actuating the shaft.

In testimony whereof, I have signed this specification in the presence of two subscribing witnesses.

EDGAR D. MISNER.

Witnesses:
W. N. WOODSON,
JNO. MIRIE.